United States Patent [11] 3,615,270

[72] Inventor John A. Snover
 Beverly Farms, Mass.
[21] Appl. No. 218,803
[22] Filed Aug. 20, 1962
[45] Patented Oct. 26, 1971
[73] Assignee Metal Hydrides Incorporated
 Beverly, Mass.

[54] METAL BERYLLIUM HYDRIDES AND METHOD FOR PREPARING THE SAME
 12 Claims, No Drawings
[52] U.S. Cl..................................................... 23/360,
 260/665, 149/87
[51] Int. Cl....................................................... C01b 6/24
[50] Field of Search............................................ 23/14, 360

[56] References Cited
OTHER REFERENCES

Wiberg et al., Z. Naturfarsch, 6B, P. 171 (1951) abstracted in Chem. Abstracts, Vol. 46 (1952), Abstracts No. 38916, copy available in POSL.

Nuclear Science Abstracts, Vol. 7 No. 3352 (1953) P. 410, copy available in POSL QC 770 n 96.

Primary Examiner—Carl D. Quarforth
Assistant Examiner—Franklin M. Gittes
Attorney—J. Harold Boss CLAIM: 1. The method for preparing metal beryllium hydrides conforming to the formula $M_2(BeH_4)_m$ where M is a metal selected from the group consisting of alkali metals and alkaline earth metals and m is the valence of the metal M, which comprises mixing an organo metal beryllium compound conforming to the formula $M(BeR_3)_m$ with a solution in an ether solvent of a compound conforming to the formula $M(AlH_4)_m$ thereby forming a liquor containing a compound conforming to the formula $AlR_3$ dissolved therein and a precipitated compound conforming to the formula $M_2(BeH_4)_m$, being selected from the group consisting of methyl, ethyl, propyl, isopropyl, secondary butyl, tertiary butyl, isobutyl, n-pentyl, n-butyl, n-hexyl, n-octyl, Stearyl, cyclopentyl, cyclohexyl, phenyl, 1,1-diphenylhexyl, 1-phenyl-2-butenyl, 1-phenyl-1-methylethyl, and 3-methyl-2-butenyl radicals.

METAL BERYLLIUM HYDRIDES AND METHOD FOR PREPARING THE SAME

This invention relates to novel metal beryllium hydrides containing the group $BeH_4^-$ and conforming to the formula $M_2(BeH_4)$'m where M is selected from alkali metals and alkaline earth metals, and $m$ is the valence of the metal M. These compounds are useful as components of high-energy fuels.

The copending application of John A. Snover and Richard D. Donovan, Ser. No. 214,445, filed July 26, 1962, describes a method for preparing organolithium beryllium compounds having the formula $LiBeR_3$ where R is a hydrocarbon radical which forms compounds conforming to the formula RLi which are soluble in liquid hydrocarbons, such as hexane. This method comprises forming a slurry of a beryllium halide such as the chloride, bromide or iodide, in a hexane solution of the compound RLi in which the compound RLi and beryllium halide are present in the molar ratio of about 3 moles of the compound RLi for each mole of beryllium halide. Diethyl ether is slowly added to the slurry thereby forming a solution of the compound $LiBeR_3$ in a mixture of hexane and diethyl ether containing precipitated lithium halide. The reaction is illustrated by the equation:

When the precipitated lithium halide is filtered off and the filtrate concentrated under vacuum at room temperature to remove the solvents, a nonvolatile liquid is obtained conforming to the formula $LiBeR_3$.

I have discovered that when a solution of lithium aluminum hydride in diethyl ether, preferably of about 5 molar concentration, is added slowly to the compound $LiBeR_3$ at room temperature, a white precipitate of lithium beryllium hydride is formed in a solution of an aluminum compound having the formula $AlR_3$. The reaction is illustrated by the equation:

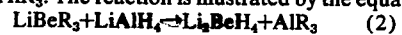

The precipitated lithium beryllium hydride may be removed by filtration, washed with hexane, and dried under vacuum at 60° C.

The diethyl ether may be replaced by other ethers, such as dipropyl ether, propyl methyl ether, dibutyl ether, tetrahydrofuran, tetrahydropyran, and the dimethyl ethers of ethylene and diethylene glycol.

I have further discovered that the compounds $LiBeR_3$ and $LiAlH_4$ in the reaction illustrated by equation (2) above may be replaced with other compounds having the formulas $M(BeR_3)_m$ and $M(AlH_4)_m$, respectively, where M is an alkali metal or alkaline earth metal, such as sodium, lithium, potassium, calcium, magnesium, barium, strontium, etc., and $m$ is the valence of the metal M.

The compounds having the formula $M(BeR_3)_m$ used in the practice of the invention may be prepared by replacing the compound RLi in the reaction illustrated by the equation (1) above by other compounds having the formula $R_mM$. The compounds having the formula $R_mM$ may be prepared by reacting the metal M with organobromides having the formula RBr in a liquid hydrocarbon, such as hexane.

The radicals represented by R above are hydrocarbon radicals which form compounds conforming to the formula $R_mM$ which are soluble in liquid hydrocarbons and which form compounds $M(BeR_3)_m$ which are soluble in the ether used in the practice of the invention. As illustrative of such radicals I may mention methyl, ethyl, propyl, isopropyl, secondary butyl, tertiary butyl, isobutyl, n-pentyl, n-butyl, n-hexyl, n-octyl, stearyl, cyclopentyl, cyclohexyl, phenyl, 1,1-diphenylhexyl, 1-phenyl-2-butenyl, 1-phenyl-1-methylethyl, and 3-methyl-2-butenyl radicals.

In place of the metal aluminum hydrides having the formula $M(AlH_4)_m$ other hydrides may be used such as metal hydrides having the formula $MH_m$, dissolved in aluminum alkyls having the formula $AlR_3$; metal aluminum alkoxy hydrides having the formula $M(AlH_xOR_{4-x})_m$ where $x$ is a number from 1 to 3; aluminum hydride; alkyl aluminum hydrides having the formula $AlR_yH_{3-y}$ where $y$ is either 1 or 2; and boron hydrides conforming to one of the formulas $M(BH_4)_n$, $B_2H_6$, or $R_3N:BH_3$.

Other methods for preparing the compounds having the formula $M(BeR_3)_m$ are known to those skilled in the art. Thus, the organometal compound having the formula $R_mM$ may be reacted in an ether medium with an organoberyllium compound having the formula $mBeR_3$.

The invention is illustrated further by the following specific examples.

EXAMPLE 1

To 38.4 grams of n-butyl lithium in 360 ml. of hexane was added 16 grams of 99.5 percent beryllium chloride. The slurry was stirred rapidly and cooled as 200 ml. of dry diethyl ether was added over a period of 1 hour. This solution was filtered under a dry nitrogen atmosphere. The filtrate was concentrated under vacuum at room temperature. To this solution of 37.6 grams of lithium beryllium n-butyl was added dropwise over 1.5 hours a total of 7.6 grams of lithium aluminum hydride in the form of a 5.1 molar solution in diethyl ether. Heat was evolved as a fine, white solid formed. The mixture was stirred overnight at room temperature and then filtered under dry nitrogen. The product was washed with hexane and dried in vacuum at 60° C. for several hours. The product weighed 2.98 grams and analyzed by weight percent: 14.46 percent hydride, 33.1 percent beryllium, 53.8 percent lithium, 0.11 percent aluminum and 2.15 percent carbon. The purity was about 96 percent and the chemical yield was 54 percent.

The product obtained was found to give an X-ray diffraction pattern which did not agree with the known $d$-spacings of lithium hydride, lithium aluminum hydride, lithium or beryllium metal. Beryllium hydride, which is thought to be polymeric in nature, was found to be amorphous by X-ray analysis. Therefore, it can be concluded from the X-ray analysis that the lithium beryllium hydride produced by this example is not merely a mixture of lithium hydride and beryllium hydride. Also, the density of this material was measured to be 0.722 grams/cc., which is greater than that of beryllium hydride. Infrared spectra, both as a mull and as a $KB_r$ pellet, showed two broad bands of absorbance; one from 5.0 to 8.5 micron with a maximum at 6.5 micron, the other band from 8.5 to 15 micron with a small maximum at 12.2 micron.

EXAMPLE 2

The same procedure and reactants were used as in example 1 except that the n-butyl lithium was replaced with an equivalent solution of isobutyl lithium prepared by reaction of lithium metal and isobutyl bromide in hexane. The product obtained was of comparable purity and yield.

EXAMPLE 3

The same procedure and reactants were used as in example 1 except that the n-butyl lithium was replaced with an equivalent amount of phenyl lithium. The product obtained was of comparable purity and yield.

EXAMPLE 4

A solution of sodium beryllium tris-n-butyl, prepared by mixing a solution of bis-n-butyl beryllium with an equivalent amount of n-butyl sodium, was reacted with a solution of sodium aluminum hydride in tetrahydrofuran. After stirring overnight, the precipitated solids were removed by filtration, washed and dried in vacuum. A good yield of sodium beryllium hydride, $Na_2BeH_4$, was obtained.

EXAMPLE 5

An ether solution of magnesium beryllium ethyl, $Mg[Be(C_2c5)_3]_2$, prepared by mixing bis-ethyl beryllium with bis-ethyl magnesium in a 2 to 1 mole ratio, was treated with a tetrahydrofuran solution of magnesium aluminum hydride. The solids which formed were stirred for 24 hours, filtered off, washed with hexane and dried in vacuum. Analysis of this product gave a mole ratio of magnesium to beryllium to hydrogen of 0.95 to 2.00 to 7.93, and only trace amounts of aluminum were found in the product.

I claim:
1. The method for preparing metal beryllium hydrides conforming to the formula $M_2(BeH_4)_m$ where M is a metal selected from the group consisting of alkali metals and alkaline earth metals and $m$ is the valence of the metal M, which comprises mixing an organometal beryllium compound conforming to the formula $M(BeR_3)_m$ with a solution in an ether solvent of a compound conforming to the formula $M(AlH_4)_m$ thereby forming a liquor containing a compound conforming to the formula $AlR_3$ dissolved therein and a precipitated compound conforming to the formula $M_2(BeH_4)_m$, R being selected from the group consisting of methyl, ethyl, propyl, isopropyl, secondary butyl, tertiary butyl, isobutyl, n-pentyl, n-butyl, n-hexyl, n-octyl, stearyl, cyclopentyl, cyclohexyl, phenyl, 1,1-diphenylhexyl, 1-pheny-2-butenyl, 1-phenyl-1-methylethyl, and 3-methyl-2-butenyl radicals.

2. The method as claimed by claim 1 wherein the hydrocarbon radical is an alkyl radical.

3. The method as claimed by claim 1 wherein the hydrocarbon radical is a butyl radical.

4. The method as claimed by claim 1 wherein the hydrocarbon radical is n-butyl.

5. The method as claimed by claim 1 wherein the metal M is lithium.

6. The method as claimed by claim 1 wherein the metal M is sodium.

7. The method as claimed by claim 2 wherein the metal M is lithium.

8. The method as claimed by claim 2 wherein the metal M is sodium.

9. The method as claimed by claim 3 wherein the metal M is lithium.

10. The method as claimed by claim 3 wherein the metal M is sodium.

11. The method as claimed by claim 4 wherein the metal M is lithium.

12. The method as claimed by claim 4 wherein the metal M is sodium.